Feb. 20, 1934.  P. UPHAM  1,948,321
SNAP FASTENER SOCKET
Filed April 13, 1932
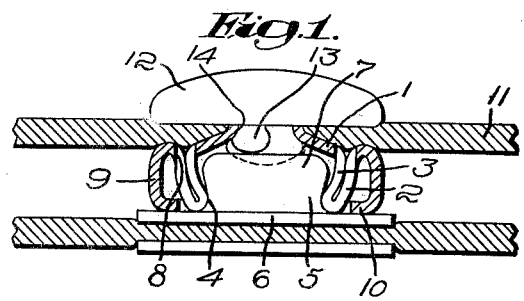
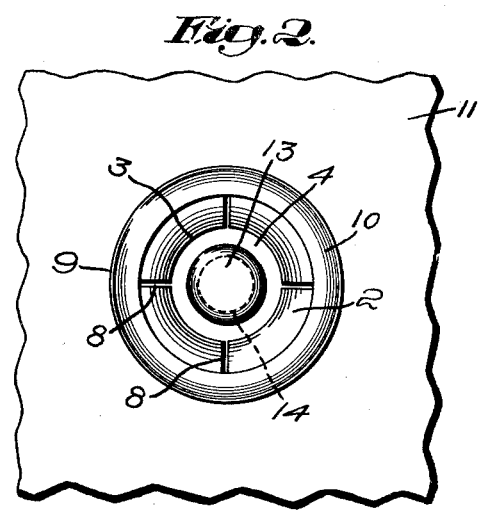
Inventor:
Preston Upham.
by Emery, Booth, Varney & Townsend
Attys.

Patented Feb. 20, 1934

1,948,321

UNITED STATES PATENT OFFICE 1,948,321

SNAP FASTENER SOCKET

Preston Upham, Brookline, Mass., assignor to United-Carr Fastener Corporation, Cambridge, Mass., a corporation of Massachusetts Application April 13, 1932. Serial No. 604,967

5 Claims. (Cl. 24—217)

My invention aims to provide improvements in snap fastener sockets.

In the drawing which illustrates a preferred embodiment of my invention:—

Figure 1 is a combination vertical section and elevation of a snap fastener installation, the socket being shown in cross-section; and Fig. 2 is a bottom plan view of my improved socket as it appears when attached to a carrying medium.

Referring to the specific socket member selected for illustration by the drawing, I have shown one which is formed from a single piece of metal and which is capable of considerable abuse. Thus I have provided a fastener socket which is simple and yet adapted for use on wearing apparel when, for instance, in laundering it may be subjected to crushing stresses.

The particular socket shown is pressed from a single piece of sheet metal passed through various dies to form a series of annularly arranged walls of substantially uniform height, as best shown in Figure 1. These walls all extend from a base 1 of the socket and have various functions to perform. Thus the two inner walls 2 and 3 curve slightly inwardly from the point where they leave the base 1 to the stud-receiving aperture 4, thereby to engage with the neck 5 of a stud 6 (Figure 1) and provide a space to receive the head 7 of the stud. The walls 2 and 3 are divided by slits 8 to permit expansion and contraction thereof as the head 7 of the stud 6 is entered into and withdrawn from the aperture 4. The outer wall 9 is rigid and has its free edge portion 10 turned inwardly to provide a smooth edge to the socket and to terminate in such spaced relation with the walls 2 and 3 that it will prevent over-expansion of those walls. This wall 9, therefore, will take the crushing stresses exerted upon the socket and prevent injury to the yieldable walls 2 and 3.

I am aware of the fact that there are other fastener sockets having a plurality of walls, but I am not aware of any structure where all of the walls extend from a common base which provides a support-engaging surface, as shown in Figure 1. While the base 1 may be secured against the fabric 11 by any suitable attaching means, I have shown a simple means for accomplishing the desired result. I have provided an attaching tack or rivet 12 having a shank 13 extending through an aperture 14 in the base 1. The end of the shank is upset against the base, thereby completing attachment.

This type of fastener which I have described is particularly desirable because it has a relatively large fabric-engaging surface thereby providing for a durable attachment. Furthermore, the construction of the fastener is such that it is particularly adapted for abusive treatment.

While I have illustrated and described a preferred embodiment of my invention, I do not wish to be limited thereby, because the scope of my invention is best defined by the following claims.

1. A snap fastener socket comprising a stud-engaging member having a support-engaging base of substantial area, a rigid peripheral wall formed integral with and extending from said support-engaging base at the outer periphery thereof and yieldable stud-engaging means extending directly from said support-engaging base independently of and in the same direction as said wall and spaced inwardly therefrom for engagement with a cooperating stud, and said stud-engaging means being protected from crushing by said peripheral wall.

2. A snap fastener socket comprising a stud-engaging member having a support-engaging base of substantial area, a rigid peripheral wall formed integral with and extending from said support-engaging base at the outer periphery thereof and yieldable stud-engaging means extending directly from said support-engaging base independently of and in the same direction as said wall and spaced inwardly therefrom for engagement with a cooperating stud, said stud-engaging means being protected from crushing by said peripheral wall and said peripheral wall having an inwardly turned ledge at its free end terminating adjacent to said yieldable stud-engaging means to prevent over-expansion thereof.

3. A snap fastener socket comprising a stud-engaging member having a support-engaging portion, a wall extending from said portion and surrounding a stud-receiving aperture, a second wall extending from said first wall back toward the plane of the support-engaging portion, both of said walls being split to permit yielding for enlargement of the stud-receiving aperture and a third rigid wall extending from said second mentioned wall and surrounding said second wall in spaced relation thereto to protect said first and second mentioned walls from crushing, said rigid wall having its free edge terminating substantially in the plane of the mouth of the stud-receiving aperture.

4. A snap fastener socket comprising a stud-engaging member formed from a single piece of sheet metal and having a support-engaging base of substantial area having an aperture in the center thereof for reception of an attaching element to be upset against said base, a rigid peripheral wall extending from the outer periphery of said support-engaging base and two other walls extending directly from said base and located inwardly from and protected by said peripheral wall, said other walls being split to permit expansion and contraction thereof for engagement with a cooperating stud, and said peripheral wall having its free edge bent inwardly to prevent over-expansion of said stud-engaging walls.

5. A snap fastener socket installation comprising a stud-engaging member having a support-engaging portion, a wall extending from said portion and surrounding a stud-receiving aperture, a second wall extending from said first wall back toward the plane of the support-engaging portion, both of said walls being split to permit yielding for enlargement of the stud-receiving aperture and a third rigid wall extending from said second mentioned wall and surrounding said second wall in spaced relation thereto to protect said first and second mentioned walls from crushing, a carrying support resting against said support-engaging portion, and an attaching member on the other side of the support having a shank extending through the support and the support-engaging portion and having its end upset against said support-engaging portion.

PRESTON UPHAM.